Patented Jan. 23, 1951

2,538,942

UNITED STATES PATENT OFFICE 2,538,942

PROCESS FOR THE PRODUCTION OF STREPTOMYCIN USING SOYBEAN MEAL-DISTILLERS SOLUBLES MEDIUM

Lloyd E. McDaniel, Rahway, N. J., assignor to Merck & Co., Inc., Rahway, N. J., a corporation of New Jersey No Drawing. Application June 20, 1947,
Serial No. 756,101

7 Claims. (Cl. 195—80)

This invention relates to a process for the production of the antibiotic agent streptomycin by the fermentation of mashes of new and improved composition with streptomycin-producing strains of *Streptomyces griseus* under submerged aerated conditions.

The antibiotic substance, streptomycin, as described by Schatz, Bugie, and Waksman in the Proceedings of the Society for Experimental Biology and Medicine, volume 55, (1944), pages 66 to 69, may be prepared by the propagation of streptomycin-producing strains of *Streptomyces griseus*, (formerly called *Actinomyces griseus*) in a suitable aqueous medium and under proper fermentation conditions.

Dr. Selman Waksman and his co-workers found that, for streptomycin production, the medium used for the propagation of streptomycin-producing strains of *Streptomyces griseus* should contain four types of nutritive and streptomycin-producing substances. These four types of Waksman mash ingredients are:

1. A carbohydrate such as glucose.
2. A complex nitrogenous material such as peptone or tryptone.
3. An inorganic salt such as sodium chloride.
4. A small amount of a complex nitrogenous organic substance containing a specific factor essential for promoting streptomycin production by the organism. This essential factor, promoting streptomycin production by the organism, was disclosed as being present in varying degrees in such complex nitrogenous organic materials as meat extract and corn steep liquor.

In the propagation of streptomycin-producing strains of *S. griseus* so that streptomycin is produced in the medium, it has previously been considered essential to have one or the other, or both, of these sources of the requisite streptomycin-promoting factor present. For example, a preferred medium for propagation of the microorganism and elaboration of streptomycin, as employed by Dr. Waksman and his co-workers, is an aqueous liquid containing 1% glucose, 0.5% peptone or tryptone, 0.3% meat extract and 0.5% sodium chloride. In place of the meat extract 1.2% of corn steep liquor is shown as a source of the streptomycin-promoting factor, but in all cases, in order that streptomycin might be produced in the medium, Dr. Waksman and his co-workers considered it essential that either meat extract, or corn steep liquor, (preferably meat extract), be present.

The necessity for providing an aqueous nutrient medium for streptomycin-producing strains of *S. griseus* which contains meat extract is, of course, generally not too desirable from the industrial point of view, since meat extract is an expensive human food. While the necessary streptomycin-promoting factor has been disclosed by Dr. Waksman and his co-workers as being present also in corn steep liquor, and corn steep liquor is generally available in quantity as a commercial product, results of the most satisfactory character in the production of streptomycin on a commercial scale have been obtained only when the growth mediums contained meat extract. While corn steep liquor has been found, in industrial practice, to be a desirable constituent of mediums used for the elaboration of streptomycin therein by streptomycin-producing strains of *S. griseus*, it has been found impossible to dispense entirely with meat extract. In view of the costly character of meat extract, various attempts have been made to replace it by less expensive sources of the streptomycin-promoting factor other than corn steep liquor but, prior to the present discoveries, it has been impossible to do so in the production of streptomycin industrially.

I have now found that it is possible to replace the meat extract constituent of mediums used for the propagation of streptomycin-producing strains of *S. griseus*, and elaboration of streptomycin, by mixtures of soybean meal and distillers solubles, such mixtures serving satisfactorily as the source of the complex nitrogenous organic material necessary to supply the streptomycin-promoting factor for the production of streptomycin in the nutrient medium. Distillers solubles is a proteinaceous by-product of potable alcohol manufacture by the yeast fermentation of grain mashes, and it is commercially available at low cost in large amounts.

Distillers solubles, and methods employed industrially in its preparation, are described in an article by C. S. Boruff entitled, "Industrial Wastes—Recovery of Fermentation Residues as Feeds," in Industrial and Engineering Chemistry, volume 39, page 602 (May 1947).

It is, accordingly, the principal object of my invention to devise a process for the production of streptomycin utilizing aqueous mediums for the propagation of streptomycin-producing strains of *Streptomyces griseus*, and the elaboration of streptomycin by metabolic action of the microorganism therein, which mediums contain either as the sole source of the necessary streptomycin-promoting factor, or as one of the sources of the necessary streptomycin-promoting factor, mixtures of soybean meal and distillers solubles, either alone, or in combination with other complex nitrogenous organic materials, which contain the essential streptomycin-promoting factor described by Waksman as being present in meat extract and also in corn steep liquor.

Certain supplementary objects of my invention include the provision of a process for the production of streptomycin employing improved nutrient mediums for the growth of streptomycin-producing strains of *S. griseus*, and elaboration of streptomycin therein, which mediums utilize, in place of dextrose, a cheaper dextrose containing material known as hydrol. Hydrol is the molasses-like mother liquor remaining after the crystallization and removal of commercial dextrose from hydrolyzed starch solutions.

A typical example of a medium containing soybean meal, distillers solubles, dextrose and sodium chloride in accordance with my invention is as follows:

| Ingredient | Grams per 100 milliliters of aqueous medium |
| --- | --- |
| Soybean meal | 2.0 |
| Dried distillers solubles | 0.25 |
| Dextrose | 1.0 |
| Sodium chloride | 1.0 |

The medium before inoculation with a streptomycin-producing strain of *S. griseus* is sterilized in any convenient manner. I have found that sterilization is satisfactorily effected by heating the medium and maintaining it at 120° C. for approximately 30 minutes. After cooling, the medium may be inoculated with spores, or with vegetative inoculum, of a streptomycin-producing strain of *S. griseus*, and fermented for the production of streptomycin.

It has been found that the concentration of soybean meal may vary from 1% to 5%. Although the optimal concentration may depend upon the character of the particular soybean meal product utilized, generally I have found that best results are secured when from 1 to 2% of soybean meal is present in the nutrient medium.

It has been found that the concentration of dried distillers solubles may vary within considerable limits, above a minimum concentration of about 0.1%. Although the optimal concentration may depend upon the character of the particular dried distillers solubles product utilized, generally I have found that best results are secured when from 1% to 2% of dried distillers solubles is present in the medium, especially good results being obtained with a concentration within the range 1.0% to 1.5%.

The sodium chloride content may vary up to 3% of the medium, with the optimal concentration usually falling within the range, 0.10 to 1.0%.

A source of carbohydrate is an essential constituent of our improved mediums, and I have found that dextrose may be utilized in amounts up to 4 grams per 100 milliliters of the medium, a concentration which I express for convenience as 4%. Usually best results will be obtained with dextrose concentrations ranging from 0.75% to 2%. In place of dextrose, I have obtained very satisfactory results with hydrol, a molasses-like mother liquor resulting after the crystallization and removal of commercial dextrose from a solution of hydrolyzed starch. When hydrol is used, it may be employed in amounts equivalent to those in which dextrose would be utilized in the same formula. As other suitable sources of the carbohydrate, starch, maltose, or the various dextrose and maltose-containing syrups available commercially, may be employed in equivalent amounts.

While the recovery of streptomycin from the nutrient broth or medium at the end of the fermentation period is no part of my invention, this recovery operation may be briefly summarized. It usually involves four steps:

1. Separating the microorganism from the culture broth;
2. Treating the culture broth with activated charcoal to adsorb the active product;
3. Eluting the adsorbate with a suitable liquid such as an alcoholic solution of a mineral acid, for example hydrochloric acid of low normality, and
4. Recovering streptomycin from the eluate.

My invention contemplates, of course, the use of standard or usual inoculation techniques, such as preparing a water suspension of the spores of a streptomycin-producing strain of *Streptomyces griseus* from a sporulated agar slant and utilizing such spore suspension to inoculate a shake flask culture for the propagation of a supply of vegetative inoculum for large scale tank fermentation.

As examples of my new and improved process for the production of streptomycin by submerged aerated fermentation of mashes containing mixtures of soybean meal and distillers solubles, the following data are submitted:

*Example 1*

The following medium was prepared:

| Ingredient | Grams per 100 milliliters of aqueous medium |
| --- | --- |
| Dried distillers solubles | 0.5 |
| Soybean meal | 2.0 |
| Dextrose | 1.0 |
| Sodium chloride | 1.0 |

The dried distillers solubles, a by-product of potable alcohol manufacture by the yeast fermentation of grain mashes, was secured in dried form from a whiskey distillery.

The above described mash, in adequate quantity, was pumped into a 100-gallon carbon steel fermenter, sterilized for 30 minutes at 120° C., cooled, inoculated with a vegetative culture of a streptomycin producing strain of *S. griseus*, and incubated at 25° C., under submerged conditions of aeration and mechanical agitation for a period of 84 hours, a procedure which resulted in a fermented broth potency of 355 units of streptomycin per milliliter.

*Example 2*

The following medium, after appropriate sterilization, cooling, and inoculation with a streptomycin producing strain of *S. griseus*, yielded after incubation in rotary shake flasks at 27° C., a fermented broth containing 480 units of streptomycin per milliliter:

| Ingredient | Grams per 100 milliliters of aqueous medium |
| --- | --- |
| Dried distillers solubles | 0.25 |
| Soybean meal | 2.0 |
| Dextrose | 1.0 |
| Sodium chloride | 1.0 |

Example 3

The following mediums, after appropriate sterilization, cooling, and inoculation with a streptomycin-producing strain of *S. griseus*, were incubated in rotary shake flasks at 27° C.:

1.5% soybean meal (Staley's Special Nutrient 4S)
1.0% dextrose
0.25% NaCl
Varying amounts of distillers solubles ranging from 0.5% to 2.0%, more specifically 0.5%; 0.75%; 1.0%; 125%; 1.5%; and 2.0% distillers solubles concentration.
Tap water to 100%.

After 3 days the yields of streptomycin obtained from the mediums containing the varying amounts of distillers solubles were as follows:

| Concentration of Distillers Solubles | Yield of Streptomycin |
|---|---|
| Per cent | Units/ml. |
| 0.5 | 590 |
| 0.75 | 500 |
| 1.0 | 550 |
| 1.25 | 640 |
| 1.5 | 640 |
| 2.0 | 490 |

Example 4

The following mediums, after appropriate sterilization, cooling, and inoculation with a streptomycin-producing strain of *S. griseus*, were incubated in rotary shake flasks at 27° C.:

1.5% soybean meal (Staley Special Nutrient 4S)
1.5% dextrose
0.25% NaCl
Varying amounts of distillers solubles ranging from none to 1.5%; more specifically, the following distillers solubles concentrations: none, 0.25%; 0.5%; 0.75%; 1.0%; 1.25% and 1.5%.
Tap water to 100%.

After 3 days the yields of streptomycin obtained from the mediums containing varying amounts of distillers solubles were as follows:

| Concentration of Distillers Solubles | Yield of Streptomycin |
|---|---|
| | Units/ml. |
| 0 | 305 |
| 0.25 | 440 |
| 0.5 | 495 |
| 0.75 | 570 |
| 1.0 | 475 |
| 1.25 | 470 |
| 1.5 | 530 |

Various changes and modifications may be made in my invention, certain preferred embodiments of which are herein disclosed, without departing from the scope thereof; to the extent that these changes and modifications are within the scope of the appended claims, they are to be considered as part of my invention.

I claim:

1. A process for the production of streptomycin in enhanced yields which comprises propagating a streptomycin producing strain of *Streptomyces griseus* under submerged aerated conditions in an aqueous nutrient medium containing soybean meal and distillers solubles.

2. A process for the production of streptomycin in enhanced yields which comprises propagating a streptomycin producing strain of *Streptomyces griseus* under submerged aerated conditions in an aqueous nutrient medium comprising soybean meal, distillers solubles, and a carbohydrate assimilable by the organism.

3. A process for the production of streptomycin in enhanced yields which comprises propagating a streptomycin producing strain of *Streptomyces griseus* under submerged aerated conditions in an aqueous nutrient medium comprising soybean meal, distillers solubles, and dextrose.

4. A process for the production of streptomycin in enhanced yields which comprises propagating a streptomycin producing strain of *Streptomyces griseus* under submerged aerated conditions in an aqueous nutrient medium containing distillers solubles, soybean meal and hydrol.

5. A process for the production of streptomycin in enhanced yields which comprises propagating a streptomycin producing strain of *Streptomyces griseus* under submerged aerated conditions in an aqueous nutrient medium comprising the following ingredients in the indicated concentration ranges:

| Ingredient | Grams per 100 milliliters of aqueous medium | |
|---|---|---|
| | Minimum | Maximum |
| Dextrose | 0.75 | 4.0 |
| Soybean meal | 1.0 | 5.0 |
| Dried distillers solubles | 0.1 | 1.0 |
| Sodium chloride | 0.1 | 3.0 |

6. A process for the production of streptomycin in enhanced yields which comprises propagating a streptomycin producing strain of *Streptomyces griseus* under submerged aerated conditions in an aqueous nutrient medium comprising the following ingredients in the indicated concentration ranges:

| Ingredient | Grams per 100 milliliters of aqueous medium | |
|---|---|---|
| | Minimum | Maximum |
| Hydrol | 0.75 | 4.0 |
| Soybean meal | 1.0 | 5.0 |
| Dried distillers solubles | 0.1 | 1.0 |
| Sodium chloride | 0.1 | 3.0 |

7. A process for the production of streptomycin in enhanced yields which comprises propagating a streptomycin producing strain of *Streptomyces griseus* under submerbed aerated conditions in an aqueous nutrient medium comprising the following ingredients in the indicated concentration ranges:

| Ingredient | Grams per 100 milliliters of aqueous medium | |
|---|---|---|
| | Minimum | Maximum |
| Assimilable carbohydrate | 0.75 | 4.0 |
| Soybean meal | 1.0 | 5.0 |
| Dried distillers solubles | 0.1 | 1.0 |
| Sodium chloride | 0.1 | 3.0 |

LLOYD E. McDANIEL.

(References on following page)

REFERENCES CITED

The following references are of record in the file of this patent:

UNITED STATES PATENTS

| Number | Name | Date |
|---|---|---|
| 1,460,736 | Takamine | July 3, 1923 |
| 2,051,017 | Schwarz | Aug. 11, 1936 |
| 2,098,200 | Stiles | Nov. 2, 1937 |
| 2,202,161 | Miner | May 28, 1940 |
| 2,422,230 | Foster | June 17, 1947 |
| 2,437,918 | McCormack | Mar. 16, 1948 |
| 2,449,866 | Waksman | Sept. 21, 1948 |
| 2,457,585 | McCormack | Dec. 28, 1948 |
| 2,461,922 | Rake | Feb. 15, 1949 |
| 2,504,067 | Colingsworth | Apr. 11, 1950 |

OTHER REFERENCES

McMahon, Jour. Bact., April 1944, No. 47, pp. 400 to 402.

Schatz et al., "Streptomycin," Proc. Soc. Exp. Biol. and Med., January 1944, pp. 66 to 69.

Page et al., J. Biol. Chem., 162, pp. 163 to 171.